(12) United States Patent
Cummins et al.

(10) Patent No.: US 7,452,412 B2
(45) Date of Patent: Nov. 18, 2008

(54) HIGH-EFFICIENCY FILTER DEVICE AND METHOD FOR MAKING SAME

(75) Inventors: Stephen B. Cummins, Kansas City, MO (US); Gil Radolovich, Leawood, KS (US); Gary Cooper, Odessa, MO (US)

(73) Assignee: Midwest Research Institute, Inc., Kansas City, MO (US)

( * ) Notice: Subject to any disclaimer, the term of this patent is extended or adjusted under 35 U.S.C. 154(b) by 452 days.

(21) Appl. No.: 10/925,246

(22) Filed: Aug. 24, 2004

(65) Prior Publication Data
US 2006/0042208 A1    Mar. 2, 2006

(51) Int. Cl.
*B01D 46/00* (2006.01)
(52) U.S. Cl. .............................. 96/154; 55/486; 55/524; 55/527; 422/177
(58) Field of Classification Search .................... 55/524, 55/527, 356, 385.2, 486, 487; 210/198.2, 210/635, 80, 488, 489, 490, 491, 504, 506, 210/505, 507, 508; 95/88, 285, 287, 90; 264/DIG. 46; 422/177; 96/154, 153, 108, 96/134
See application file for complete search history.

(56) References Cited

U.S. PATENT DOCUMENTS

| | | | | |
|---|---|---|---|---|
| 2,369,481 A | * | 2/1945 | Modigliani | 28/240 |
| 2,577,214 A | * | 12/1951 | Slayter | 442/334 |
| 2,736,676 A | * | 2/1956 | Frickert, Jr. | 442/355 |
| 3,341,394 A | * | 9/1967 | Kinney | 442/366 |
| 3,826,067 A | * | 7/1974 | Wilder et al. | 55/524 |
| 4,048,068 A | * | 9/1977 | Hirs | 210/793 |
| 4,378,983 A | * | 4/1983 | Martin | 55/357 |
| 4,839,331 A | | 6/1989 | Maroldo et al. | |
| 5,279,742 A | | 1/1994 | Markell et al. | |
| 5,599,445 A | * | 2/1997 | Betz et al. | 210/198.2 |
| 5,630,937 A | | 5/1997 | Betz et al. | |
| 5,691,206 A | | 11/1997 | Pawliszyn | |
| 5,993,501 A | | 11/1999 | Cusick et al. | |
| 6,099,607 A | * | 8/2000 | Haslebacher | 55/356 |

(Continued)

FOREIGN PATENT DOCUMENTS

DE    20207663 U1 * 10/2002

OTHER PUBLICATIONS

Jinping Jia, et al.; Adjusted Active Carbon Fibers for Solid Phase Microextraction; J. Environ. Sci. Health; 2002; pp. 489-498; vol./Issue A37(4); Marcel Dekker, Inc., date unknown.

(Continued)

*Primary Examiner*—Duane Smith
*Assistant Examiner*—Ives Wu
(74) *Attorney, Agent, or Firm*—Husch Blackwell Sanders LLP

(57) ABSTRACT

A high-efficiency filter for removing or collecting trace levels of chemical compounds includes a randomly oriented glass substrate, a primer coating and a carbon coating. The present filter is operable to sample or remove chemical compounds from the air with a high volumetric capacity while maintaining a low pressure drop across the filter substrate. A method for making the present filter includes providing a glass substrate with randomly oriented glass fibers which is treated to remove any glue or other substances; the substrate is then coated with a primer including polydimethylsiloxane; and the primed substrate is then coated with a carbonaceous compound including polydimethylsiloxane.

17 Claims, 1 Drawing Sheet

U.S. PATENT DOCUMENTS

| | | | | |
|---|---|---|---|---|
| 6,514,326 | B1* | 2/2003 | Hara et al. | 96/133 |
| 6,736,133 | B2* | 5/2004 | Bachinski et al. | 126/521 |
| 6,756,125 | B2 | 6/2004 | Al-Lamee | |
| 6,966,939 | B2* | 11/2005 | Rammig et al. | 55/486 |
| 6,984,262 | B2* | 1/2006 | King et al. | 106/287.22 |
| 2005/0136758 | A1* | 6/2005 | Newton et al. | 442/43 |
| 2006/0000196 | A1* | 1/2006 | Beier et al. | 55/497 |

OTHER PUBLICATIONS

Jacek Koziel, et al.; Air Sampling With Porous Solid-Phase Microextraction Fibers; Analytical Chemistry; Nov. 1, 2000; pp. 5178-5186; vol. 72; Issue 21; American Chemical Society; USA.

Robert E. Shirey; Optimization of Extraction Conditions and Fiber Selection for Semivolatile Analytes Using Solid-Phase Microextraction; Journal of Chromatographic Science; Jul. 2000; pp. 279-288; vol. 38.

Janusz Pawliszyn; Theory of Solid-Phase Microextraction; Journal of Chromatographic Science; Jul. 2000; pp. 270-278; vol. 38.

Ludovic Tuduri, et al.; Dynamic Versus Static Sampling for the Quantitative Analysis of Volative Organic Compounds in Air with Polydimethysiloxane-Carboxen Solid-Phase Microextraction Fibers; Journal of Chromatography A; pp. 49-55; vol./Issue 963; Eelsevier Science B.V., date unknown.

Abir Khaled, et al.; Time-Weighted Average Sampling of Volatile and Semi-Volatile and Semi-Volatile Airborne Organic Compounds by the Solid-Phase Microextraction Device; Journal of Chromatography A; 2000; pp. 455-467; vol./Issue 892; Elsevier Scie3nce B.V., date unknown.

P. Popp, et al.; Using Carboxen-Polydimethylsiloxane Fibers; Chromatographia; Oct. 1997; pp. 419-422; vol. 46, Issue No. 7/8; Friedr. Vieweg & Sohn Verlagsgesellschaft mbH.

P. Popp, et al.; Solid Phase Microextraction fo Volatile Organic Compounds Using Carboxen-Polydimethylsiloxane Fibers; Chromatographia; Oct. 1997; pp. 419-424; vol. 46, Issue No. 7/8; Friedr. Vieweg & Sohn Verlagsgesellschaft mbH.

Wouter H.J. Vaes, et al.; Partitioning of Organic Chemicals to Polyacrylate-Coated Solid Phase Microextraction Fibers: Kinetic Behavior and Quantitative Structure—Property Relationships; Analytical Chemistry; Dec. 15, 1996; pp. 4458-4462; vol. 68; Issue No. 24; American Chemical Society.

M. Mestres, et al.; Headspace Solic-Phase Microextraction of Sulphides and Disulphides Using Carboxen-Polydimethylsiloxane Fibers in the Analysis of Wine Aroma; Journal of Chromatography A; 1999; pp. 137-144; vol./Issue 835; Elsevier Science B.V., date unknown.

P. Popp, et al.; Solid Phase Microextraction of Volatile Organic Compounds Using Carboxen-Polydimethylsiloxane Fibers; Chromatographia; Oct. 19997; pp. 419-424; vol. 46; Issue No. 7/8; Friedr. Vieweg & Sohn Verlagsgesellschaft mbH.

Technical Textiles International; Activated Carbon Cloth—Zorflex; International Newsletters; Apr. 1, 2003; p. 1.

Calgon Carbon Corporation; Activated Carbon Cloth—Carbon Products and Technologies; calgoncarbon.com; Jul. 23, 2003; p. 1.

Calgon Carbon Corporation; Safeguarding Our Air Supply; calgoncarbon.com; Jul. 23, 2003; pp. 1-2.

Calgon Carbon Corporation; Pur-Fect for Toluene Diisocyanate Emission Control in the Polyurethane Industry; calgoncarbon.com; Jul. 23, 2003; pp. 1-4.

American Filteration; AmAir C—Disposable Filters for Economical, Effective, Long-Lasting Odor Control and Particulate Filtration; aafilters.com; Jul. 22, 2003; pp. 1-8.

Cameron Carbon, Inc.; Activated Carbon & Related Technology; thomasregister.com; Jul. 22, 2003; p. 1.

Cameron Carbon, Inc.; Specialty Media; thomasregister.com; Jul. 22, 2003; pp. 1-2.

Cameron Carbon, Inc.; Vapor Phase Carbons; thomasregister.com; Jul. 22, 2003; pp. 1-2.

Chester Lab Net; Sampling Media (Filters); chesterlab.net; Jul. 18, 2003; pp. 1-2.

Bomir, Inc.; XF Series-Bench Top Smoke Absorbers; bomir.com; Jul. 18, 2003; pp. 1-2.

Bon-Aire Filters, Inc.; Bon-Aire Polyarb—Activated Carbon Filters; bon-airefilters.com; Jul. 18, 2003; pp. 1-2.

Bon-Aire Filters, Inc.; Materials Guide; bon-airefilters.com; Jul. 18, 2003; pp. 1-3.

Bon-Aire Filters, Inc.; Paint Arrestor Filters; bon-airefilters.com; Jul. 18, 2003; pp. 1-6.

* cited by examiner

HIGH-EFFICIENCY FILTER DEVICE AND METHOD FOR MAKING SAME

BACKGROUND OF THE INVENTION

This invention relates to filters for sampling or cleaning chemical compounds from the air and, more particularly, to a glass based filter for collecting volatile, semi-volatile and particulate phase chemical compounds from the air.

Air filtration devices are used primarily to clean air by removing particles and undesirable chemical odors. Secondarily, they are essential to air sampling technology for the determination of contaminants by collecting trace levels of chemical compounds. Air filter systems exist that are capable of collecting trace chemicals. Likewise, other air filter systems operate without a large pressure drop. However, at a practical level, a filter not only needs to collect chemical contaminants from the air, but it must do so without impeding the ventilation system in which it is installed. Therefore, a high capacity, low pressure drop filter capable of collecting volatile, semi-volatile and to a degree, particulate chemical compounds is needed.

Existing filter technology uses different substrates coated with, or created from activated carbon to collect chemical constituents from the air. These substrates include glass, paper and other fibers. It is well known in the art to coat these substrates with a coating including activated carbon. The activated carbon functions to "trap" or adsorb chemicals present in the air stream.

SUMMARY OF THE INVENTION

There is, therefore, provided in the practice of the invention a novel high-efficiency air filtration device and method of making the same for the collection of trace chemical constituents at a high linear face velocity and with a correspondingly low pressure drop. The high-efficiency filter includes a random glass substrate with a carbon coating. The high-efficiency filter can be used in sampling situations to collect trace chemicals, or as a filter or pre-filter to remove chemical compounds from the air.

In a preferred embodiment, a high-efficiency filter includes a random-strand, progressive denier, fiber-glass substrate and a carbon coating applied to the substrate. The carbon coating is applied in a manner to completely coat the glass substrate.

In another embodiment, the high-efficiency filter is made by thermally treating a random glass substrate to remove impurities, such as glue. The thermally cleaned substrate is then coated with a primer containing polydimethylsiloxane. Once the primer coat has dried, the carbon coating is applied.

Accordingly, it is an object of the present invention to provide an improved high-efficiency filter for use in sampling technologies to detect trace level chemical compounds.

It is a further object of the present invention to provide an improved method for making a high-efficiency filter for use in sampling technologies.

BRIEF DESCRIPTION OF THE DRAWINGS

These and other inventive features, advantages, and objects will appear from the following Detailed Description when considered in connection with the accompanying drawing in which similar reference characters denote similar elements.

DETAILED DESCRIPTION

Figure 1:
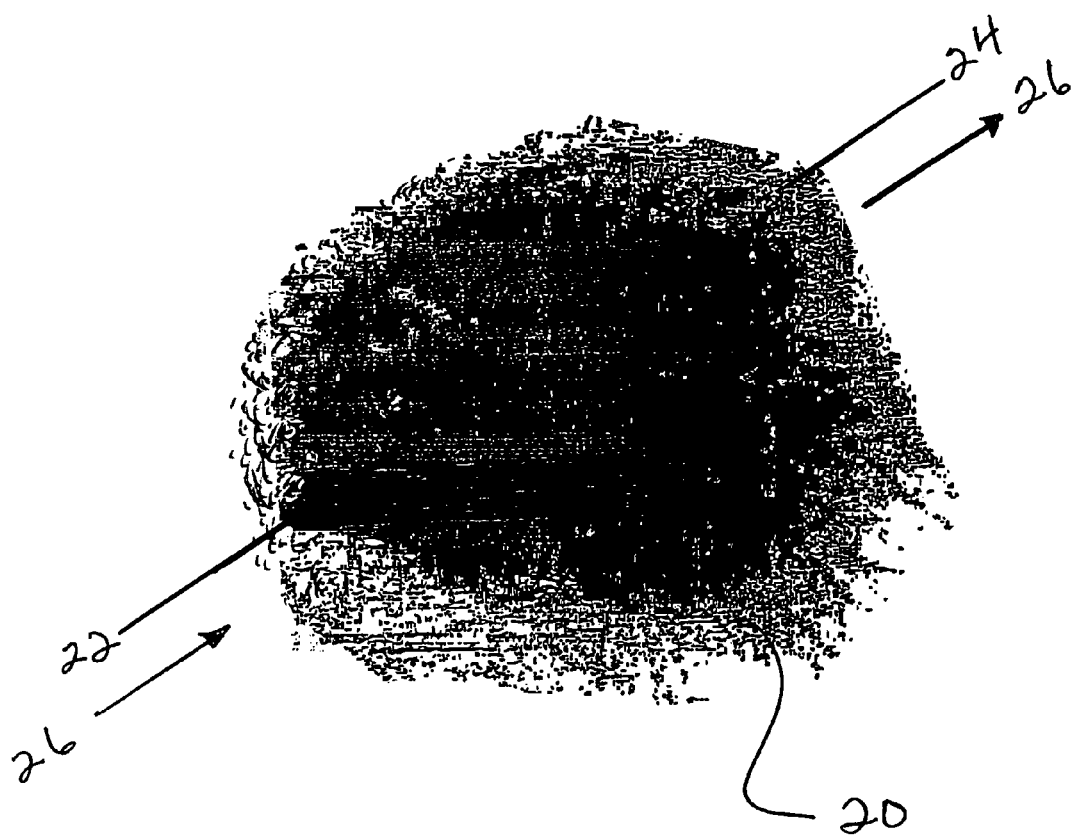
FIG. 1 is a side view of a high-efficiency filter constructed in accordance with the teachings of the present invention.

Referring to the drawings in greater detail, FIG. 1 shows a high-efficiency filter 20 constructed in accordance with a preferred embodiment of the present invention. The filter 20 includes a randomly oriented glass substrate, primer coat and carbon coating. The filter is operable to sample or remove chemical compounds from the air with a high volumetric capacity while maintaining a low pressure drop across the filter substrate.

In a preferred embodiment, the randomly oriented glass substrate, as shown in FIG. 1, is a laminate collection of biaxially oriented and randomly spun glass fibers of increasing denier with respect to the thickness of each laminate layer positioned into a cylindrical shape prior to the final compression into a disk for certain applications, or left in the shape of a cylinder for others. The glass substrate appears spherical due to the filter media's resistance to linear compression tangent to the fiber orientations. This low aspect ratio filter demonstrates this point. The fibers are alternately stacked in sheets of progressively dense layers positioned such that the densest layer is always "downstream" of a less dense layer. This is designated as the outlet 24 in FIG. 1. This arrangement provides for the extraordinary capacity of the filter to "breathe" while maintaining a tortuous network of adsorptive surface area for the air as it flows through the filter. The air enters the inlet 22 where the fibers are less dense. A good example of this configuration is the Front-Line Blue™ filter manufactured by the American Air Filter Corporation in Louisville, Ky. The glass fiber filters sold as the Front-Line Blue™ filter (one inch thick version) is coated with glue to maintain the glass fibers in the selected arrangement. To use the randomly oriented glass filter as the glass substrate, it must be treated to accept the carbon coating.

In a preferred embodiment, the glass substrate bundle is heated at approximately 280° C. to thermally clean the filter, removing any glue or other impurities. Alternatively, the thermal cleaning may occur at a temperature in the range of between approximately 100°-350° C. The glass substrate bundles are placed in alignment with the flow path 26 as shown in FIG. 1, and maintained in this position to easily identify the inlet 22 and outlet 24 side of the substrate. The substrate may be thermally cleaned in an air environment or an inert environment. Depending on the number of glass fiber filters being treated, the thermal cleaning usually takes 2 hours. The thermal cleaning takes place in a special vessel that includes a coiled sparging tube at the bottom to ensure the complete purging of volatilized constituents. In a preferred embodiment, sixteen (16) individual Front-Line Blue substrates are placed in a 30 quart pressure cooker to burn off the glue and any other impurities. The flow rate range for the thermal cleaning is 3-5 L/minute. The thermal cleaning treatment lasts approximately 2 hours. The substrate is cooled in this same vessel by continuing to flow air through the vessel.

After the glass substrate bundle is treated to remove the glue, it is ready to be primed. The substrate bundle is spray coated with a pre-weighed amount of polydimethylsiloxane ("PDMS") dissolved in methylene chloride ("MECL"), preferably at a ratio of approximately 0.27 g PDMS per gram of MECL. Before the primer coat is applied to the substrate bundle, a small amount of a platinum catalyst is added to the primer (approximately 15 ul, and shaken vigorously). The primer should be applied using a thin-layer chromatography sprayer equipped with a 0.8 mm orifice. In one embodiment, while priming, the glass fibers of the filter are maintained at a temperature above the ambient dew point. The primer should be applied to the substrate bundle while it is heated at approximately 50° C., although heating between 20° C. and 40° C. will be adequate. Once the substrate bundle is coated with the primer, it is allowed to rest at room temperature for approximately one hour. The resting period should be at least 60 minutes and up to several hours.

After the primed substrate has rested at room temperature, the carbon coating is applied. The carbon coating consists of a carbonaceous adsorbent and polydimethylsiloxane, with a platinum catalyst. In a preferred embodiment, the carbonaceous adsorbent is a product available commercially as Carboxen™ 1006 from Supelco, Bellefonte, Pa. The carbon coating should be applied using a thin-layer chromatography sprayer equipped with a 0.8 mm orifice, although any similarly small spraying device should suffice. The carbon coating consists of approximately 2-5 microns carbon particles placed in PMDS. Initially apply the carbon coating at a 90 angle to the substrate. Then multiple passes of the coating at a 45° angle should be accomplished to promote the maximum amount of penetration to the interior core of the substrate.

The carbon coating may be reapplied until the desired thickness of coating is achieved. In a preferred embodiment, the carbon coating is approximately 5-75 microns. In a more preferred embodiment, the carbon coating is approximately 25-50 microns.

Once the carbon coating is applied, the filter is conditioned or cured at a temperature in the range of between about 100° C. to about 350° C. in a special second vessel. The second vessel is similar to the first vessel in that it uses a coiled sparge tube at the bottom to ensure that the entire air space within the vessel is adequately purged of any volatile compounds during the conditioning stage. The sparging gas must be inert and of ultra-high purity. In a preferred embodiment, the filter is conditioned at a temperature in the range of approximately 280° C. to approximately 300° C. In a preferred embodiment, the filter is conditioned for approximately 120 minutes, following a 60 minute hold at 40° C. The conditioning period may last from 120 minutes to multiple hours, depending upon scheduling. After conditioning, the filter is cooled in this same second vessel.

Once the coating on the substrate bundle has been conditioned, the substrate bundle may be placed in a filter canister. The substrate bundle is removed, noting the alignment of the bundle to identify inlet and outlet, and placed in a filter canister in alignment with the flow path of the filter canister.

In another embodiment, the filter is used as a pre-filter in combination with a HEPA filter. While HEPA filters are efficient collectors for particulate forms of a variety of toxic industrial chemicals and certain biological airborne particles as well, they are unsuitable to collect gas phase industrial chemicals. The filter of the present invention is designed to efficiently collect industrial chemical vapors. When the two filter types are combined, they effectively collect both particulate (chemical and certain biological) and gas phase chemical contaminants. The pre-filter is made according to the present invention and positioned in a housing that can be removably attached to a commercially available HEPA filter.

The high efficiency filter according to the present invention provides a high volume, low pressure drop device for collecting or removing chemical compounds from the environment.

Thus, an improved high-efficiency filter is disclosed which utilizes a novel randomly oriented glass substrate with a carbon coating for detecting or collecting chemical compounds. This invention allows for superior filtering or sampling with a high volume capacity and a low pressure drop across the filter substrate. While preferred embodiments and particular applications of this invention have been shown and described, it is apparent to those skilled in the art that many other modifications and applications of this invention are possible without departing from the inventive concepts herein.

The invention claimed is:

1. A high-efficiency filter comprising:
   a randomly oriented glass substrate comprising randomly spun glass fibers of increasing denier wherein said randomly oriented glass substrate is a laminate collection of biaxially oriented randomly spun glass fibers wherein each laminate layer is randomly spun to have increasing denier, and the layers are alternately stacked in sheets of progressively dense layers positioned such that the densest layer is always downstream of the less dense layer;
   a primer coating including polydimethylsiloxane applied to the glass substrate; and
   at least one layer of carbon coating substantially covering the primer coating, the carbon coating including polydimethylsiloxane.

2. The filter according to claim 1 wherein the carbon coating comprises a carbonaceous adsorbent.

3. The filter according to claim 2 wherein the primer coating further includes a platinum catalyst.

4. The filter according to claim 2 wherein the glass substrate includes glass fibers arranged so that the fibers on one side of the substrate are more densely positioned as compared to the fibers on the other side of the substrate.

5. A high efficiency filter for removing particulates and chemical vapors from the air, comprising:
   a pre-filter assembly including at least one randomly oriented glass substrate comprising randomly spun glass fibers of increasing denier, wherein said randomly oriented glass substrate is a laminate collection of biaxially oriented randomly spun glass fibers wherein each laminate layer is randomly spun to have increasing denier, and the layers are alternately stacked in sheets of progressively dense layers positioned such that the densest layer is always downstream of the less dense layer; a primer coating including polydimethylsiloxane applied to the glass substrate; and at least one layer of carbon coating substantially covering the primer coating, the carbon coating including polydimethylsiloxane;
   a housing for containing the pre-filter assembly;
   a HEPA pleated aerosol filter with housing; and
   means associated with the pre-filter housing for removably attaching the pre-filter assembly to the HEPA filter housing.

6. The filter according to claim 5 wherein the glass substrate is primed with a primer coating which includes polydimethylsiloxane.

7. The filter according to claim 6 wherein the primer coating further includes a platinum catalyst.

8. The filter according to claim 5 wherein the glass substrate includes glass fibers arranged so that the fibers on one side of the substrate are more densely positioned as compared to the fibers on the other side of the substrate.

9. The filter according to claim 5 wherein the glass substrate is coated with a carbon coating which includes polydimethylsiloxane.

10. A filter comprising:
    a randomly oriented glass substrate including randomly spun glass fibers of increasing denier, the randomly spun fibers forming progressively dense layers of glass fibers, the layers being alternately stacked with a designated flow path therethrough; a primer coating including polydimethylsiloxane applied to the glass substrate; and at least one layer of a carbon coating substantially covering the primer coating, the carbon coating including polydimethylsiloxane.

11. The filter according to claim 10 wherein the carbon coating includes a platinum catalyst.

12. The filter according to claim 10 wherein the carbon coating includes a carbonaceous adsorbent and a platinum catalyst.

13. The filter according to claim 10 wherein the carbon coating has a thickness in the range of approximately 5-75 microns.

14. The filter according to claim 10 wherein the primer coating includes polydimethylsiloxane dissolved in methylene chloride.

15. The filter according to claim 14 wherein the primer coating further includes a platinum catalyst.

16. The filter according to claim 14 wherein the ratio of polydimethylsiloxane to methylene chloride is approximately 0.27g polyimethylsiloxane per gram of methylene chloride.

17. The filter according to claim 10 including a filter canister enclosing the glass substrate.

* * * * *